(12) United States Patent
Friedman et al.

(10) Patent No.: US 12,120,083 B2
(45) Date of Patent: *Oct. 15, 2024

(54) DIFFERENTIAL PRIVACY FOR MESSAGE TEXT CONTENT MINING

(71) Applicant: Apple Inc., Cupertino, CA (US)

(72) Inventors: Eric D. Friedman, Berkeley, CA (US); Ritwik K. Kumar, San Jose, CA (US); Lucas O. Winstrom, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,973

(22) Filed: Jun. 20, 2023

(65) Prior Publication Data

US 2023/0344792 A1   Oct. 26, 2023

Related U.S. Application Data

(63) Continuation of application No. 17/702,668, filed on Mar. 23, 2022, now Pat. No. 11,722,450, which is a
(Continued)

(51) Int. Cl.
*H04L 51/23* (2022.01)
*G06F 16/35* (2019.01)
(Continued)

(52) U.S. Cl.
CPC ............ *H04L 51/23* (2022.05); *G06F 16/35* (2019.01); *G06F 21/6254* (2013.01);
(Continued)

(58) Field of Classification Search
None
See application file for complete search history.

(56) References Cited

U.S. PATENT DOCUMENTS 6,842,773 B1  1/2005  Ralston et al.
7,310,660 B1  12/2007  White et al.
(Continued)

OTHER PUBLICATIONS

Anon, "IOS Security Guide IOS 10—White Paper", Apple Incorporated, Mar. 2017, 68 pages.
(Continued)

*Primary Examiner* — Scott B Christensen
(74) *Attorney, Agent, or Firm* — Kilpatrick Townsend & Stockton LLP

(57) ABSTRACT

Systems and methods are disclosed for determining whether a message received by a client may be spam, in a computing environment that preserves privacy. The message may be encrypted. A client invokes the methods when a message is received from a sender that is not known to the client. A client can decrypt the message, break the message into chunks, and apply a differentially private algorithm to the set of chunks. The client transmits the differentially private message sketches to an aggregation server. The aggregation server receives a large collection of such message sketches for a large plurality of clients. The aggregation server returns aggregated message chunk (e.g. frequency) information to the client to assist the client in determining whether the message may be spam. The client can process the message based on the determination without disclosing the message content to the server.

20 Claims, 13 Drawing Sheets

Related U.S. Application Data continuation of application No. 17/018,987, filed on Sep. 11, 2020, now Pat. No. 11,290,411, which is a continuation of application No. 15/710,736, filed on Sep. 20, 2017, now Pat. No. 10,778,633.

(60) Provisional application No. 62/399,217, filed on Sep. 23, 2016.

(51) Int. Cl.
  G06F 21/62 (2013.01)
  G06F 40/289 (2020.01)
  G06Q 10/107 (2023.01)
  H04L 51/212 (2022.01)

(52) U.S. Cl.
  CPC .......... *G06F 40/289* (2020.01); *H04L 51/212* (2022.05); *G06Q 10/107* (2013.01)

(56) References Cited

U.S. PATENT DOCUMENTS

| | | |
|---|---|---|
| 10,778,633 B2 | 9/2020 | Friedman et al. |
| 11,290,411 B2 | 3/2022 | Friedman et al. |
| 2003/0053622 A1 | 3/2003 | Bruen et al. |
| 2004/0083270 A1 | 4/2004 | Heckerman et al. |
| 2004/0148330 A1 | 7/2004 | Alspector et al. |
| 2005/0015452 A1 | 1/2005 | Corson |
| 2005/0060643 A1 | 3/2005 | Glass et al. |
| 2005/0080860 A1 | 4/2005 | Daniell et al. |
| 2010/0246960 A1 | 9/2010 | Kim |
| 2011/0064221 A1 | 3/2011 | McSherry et al. |
| 2011/0208763 A1 | 8/2011 | McSherry et al. |
| 2012/0143922 A1 | 6/2012 | Rane et al. |
| 2012/0204026 A1 | 8/2012 | Shi et al. |
| 2012/0215853 A1 | 8/2012 | Sundaram et al. |
| 2012/0296898 A1 | 11/2012 | Cormode et al. |
| 2012/0316956 A1 | 12/2012 | Nath et al. |
| 2013/0145473 A1 | 6/2013 | Cormode et al. |
| 2013/0212690 A1 | 8/2013 | Fawaz et al. |
| 2014/0137260 A1 | 5/2014 | Wang et al. |
| 2014/0196151 A1 | 7/2014 | Mishra et al. |
| 2014/0281572 A1 | 9/2014 | Wang et al. |
| 2014/0283091 A1 | 9/2014 | Zhang et al. |
| 2015/0293923 A1 | 10/2015 | Eide et al. |
| 2015/0339493 A1 | 11/2015 | Ioannidis et al. |
| 2015/0371059 A1 | 12/2015 | Bilogrevic et al. |
| 2016/0071170 A1 | 3/2016 | Massoulie et al. |
| 2016/0156595 A1 | 6/2016 | Wu et al. |
| 2016/0203333 A1 | 7/2016 | Fawaz et al. |
| 2017/0287353 A1 | 10/2017 | Kazemi et al. |

OTHER PUBLICATIONS

U.S. Appl. No. 17/018,987, "Non-Final Office Action", Jul. 20, 2021, 6 pages.
U.S. Appl. No. 17/018,987, "Notice of Allowance", Nov. 18, 2021, 7 pages.
U.S. Appl. No. 17/702,668, "Non-Final Office Action", Nov. 23, 2022, 5 pages.
U.S. Appl. No. 17/702,668, "Notice of Allowance", Mar. 16, 2023, 7 pages.
Abowd, "The Challenge of Scientific Reproducibility and Privacy Protection for Statistical Agencies", Available Online at: https://www2.census.gov/cac/sac/meetings/2016-09/2016-abowd.pdf, Census Scientific Advisory Committee, Sep. 15, 2016, 51 pages.
Akkus et al., "Non-Tracking Web Analytics", CCS '12: Proceedings of the 2012 ACM Conference on Computer and Communications Security, Oct. 2012, pp. 687-698.
Alvim et al., "Differential Privacy: On the Trade-off Between Utility and Information Leakage", Proceedings of the 8th International Workshop on Formal Aspects of Security & Trust (FAST11 ), Springer, LNCS 7140, Aug. 25, 2011, pp. 1-30.
Bassily et al., "Local, Private, Efficient Protocols for Succinct Histograms", Proceedings of the Forty-Seventh Annual ACM on Symposium on Theory of Computing, Apr. 18, 2015, 27 pages.
Chaudhuri et al., "Database Access Control & Privacy: Is There A Common Ground?", In Proceedings of CIDR 2011, Jan. 9-12, 2011, pp. 96-103.
Cormode et al., "An Improved Data Stream Summary: The Count-Min Sketch and its Applications", Journal of Algorithms, vol. 55, No. 1, Apr. 2005, 11 pages.
Ding et al., "Differentially Private Data Cubes: Optimizing Noise Sources and Consistency", Proceedings of the 2011 ACM SIGMOD International Conference on Management of data, Jul. 12-16, 2011, 12 pages.
Duchi et al., "Local Privacy and Statistical Minimax Rates", IEEE 54th Annual Symposium on Foundations of Computer Science, Feb. 2013, 10 pages.
Dwork et al., "Calibrating Noise to Sensitivity in Private Data Analysis", Lecture Notes in Computer Science, vol. 3876, Conference: Proceedings of the Third conference on Theory of Cryptography, Jan. 2006, pp. 1-20.
Dwork et al., "Differential Privacy Under Continual Observation", STOC '10: Proceedings of the Forty-Second ACM Symposium on Theory of Computing, Jun. 5-8, 2010, pp. 715-724.
Dwork et al., "The Algorithmic Foundations of Differential Privacy", Foundations and Trends® in Theoretical Computer Science, vol. 9, Nos. 3-4, Aug. 2014, 281 pages.
Ebadi et al., "Differential Privacy: Now it's Getting Personal", ACM SIGPLAN Notices, vol. 50, No. 1, Jan. 2015, pp. 69-81.
Ebadi et al., "Featherweight PINQ", Clinical Orthopaedics and Related Research, May 11, 2015, 18 pages.
Erlingsson et al., "RAPPOR: Randomized Aggregatable Privacy-Preserving Ordinal Response", CCS '14: Proceedings of the 2014 ACM SIGSAC Conference on Computer and Communications Security, Nov. 2014, pp. 1054-1067.
Fanti et al., "Building a RAPPOR with the Unknown: Privacy-Preserving Learning of Associations and Data Dictionaries", Proceedings on Privacy Enhancing Technologies, vol. 2016, No. 3, Mar. 4, 2015, pp. 41-61.
Gaboardi et al., "PSI (Ψ): A Private Data Sharing Interface", In Theory and Practice of Differential Privacy, Nov. 30, 2016, pp. 1-30.
Haeberlen et al., "Differential Privacy Under Fire", SEC'11: Proceedings of the 20th USENIX Conference on Security, Aug. 2011, pp. 1-15.
Hsu et al., "Differential Privacy: An Economic Method for Choosing Epsilon", Conference: 2014 IEEE Computer Security Foundations, Feb. 13, 2014, pp. 1-29.
Hsu et al., "Distributed Private Heavy Hitters", International Colloquium on Automata, Languages, and Programming, Feb. 22, 2012, pp. 1-19.
Hu et al., "Differential Privacy in Telco Big Data Platform", Proceedings of the VLDB Endowment, vol. 8, No. 12, Aug. 2015, pp. 1692-1703.
Kandappu et al., "Privacy in Crowdsourced Platforms", Privacy in a Digital, Networked World, Oct. 2015, pp. 57-84.
Kasiviswanathan et al., "What Can We Learn Privately?", SIAM Journal on Computing, vol. 40, No. 3, Feb. 19, 2010, pp. 1-35.
Lee et al., "πBox: A Platform for Privacy-Preserving Apps", Conference: Proceedings of the 10th USENIX Conference on Networked Systems Design and Implementation, Apr. 2013, pp. 501-514.
Li et al., "An Adaptive Mechanism for Accurate Query Answering under Differential Privacy", Proceedings of the VLDB Endowment, vol. 5, No. 6, Feb. 2012, pp. 514-525.
Liu et al., "Dependence Makes You Vulnerable: Differential Privacy Under Dependent Tuples", Network and Distributed System Security Symposium, Feb. 21-24, 2016, pp. 1-15.
Machanavjjhala et al., "Privacy: Theory Meets Practice on the Map", In Proceedings of the 2008 IEEE 24th International Conference on Data Engineering, ICDE '08, Apr. 2008, 10 pages.
McSherry, "Privacy Integrated Queries: An Extensible Platform for Privacy-Preserving Data Analysis", Communications of the ACM, In Proceedings of the 2009 ACM SIGMOD International Conference on Management of Data, Jun. 29-Jul. 2, 2009, pp. 19-30.

(56) References Cited

OTHER PUBLICATIONS

Mishra et al., "Privacy via Pseudorandom Sketches", PODS '06: Proceedings of the Twenty-Fifth ACM SIGMOD-SIGACT-SIGART Symposium on Principles of Database Systems, Jun. 26, 2006, pp. 143-152.

Mohammed et al., "Differentially Private Data Release for Data Mining", KDD '11: Proceedings of the 17th ACM SIGKDD International Conference on Knowledge Discovery and Data Mining, Aug. 2011, pp. 493-501.

Mohan et al., "GUPT: Privacy Preserving Data Analysis Made Easy", SIGMOD '12: Proceedings of the 2012 ACM SIGMOD International Conference on Management of Data, May 2012, pp. 349-360.

Narayan , "Distributed Differential Privacy and Applications", Publicly Accessible Penn Dissertations, Jan. 1, 2015, 150 pages.

Popa et al., "Privacy and Accountability for Location-Based Aggregate Statistics", CCS '11: Proceedings of the 18th ACM Conference on Computer and Communications Security, Oct. 17, 2011, pp. 653-665.

Qin et al., "Heavy Hitter Estimation Over Set-Valued Data with Local Differential Privacy", In Proceedings of the 2016 ACM SIGSAC Conference on Computer and Communications Security, CCS '16, Oct. 24-28, 2016, 12 pages.

Roy et al., "Airavat: Security and Privacy for MapReduce", Conference: Proceedings of the 7th USENIX Symposium on Networked Systems Design and Implementation, NSDI, Apr. 2010, pp. 1-16.

Vadhan , "The Complexity of Differential Privacy", Center for Research on Computation & Society John A. Paulson School of Engineering & Applied Sciences Harvard University, Aug. 9, 2016, 95 pages.

Zhang et al., "Distributed Data Mining with Differential Privacy", 2011 IEEE International Conference on Communications (ICC), Jun. 2011, 5 pages.

DIFFERENTIAL PRIVACY FOR MESSAGE TEXT CONTENT MINING

RELATED APPLICATIONS

This application is a continuation of U.S. patent application Ser. No. 17/702,668, filed Mar. 23, 2022, which is a continuation of U.S. patent application Ser. No. 17/018,987, filed Sep. 11, 2020, issued as U.S. Pat. No. 11,290,411 on Mar. 29, 2022, which is a continuation of U.S. patent application Ser. No. 15/710,736, filed Sep. 20, 2017, issued as U.S. Pat. No. 10,778,633 on Sep. 15, 2020, which claims priority to U.S. Provisional Patent Application No. 62/399,217 filed Sep. 23, 2016. These applications are hereby incorporated herein by reference in their entirety.

TECHNICAL FIELD

This disclosure relates to the field of determining whether a message received by a client is likely to be spam.

BACKGROUND

"Spam" is a ubiquitous term for a message sent to a client device that is typically unsolicited by a user of a client device. Spam may be advertising and/or may include one or more malware attachments to the spam message that could launch an attack against a receiving client that opens one of the attachments. A client that sends such unsolicited messages is termed a "spammer." A spammer may send tens of thousands, or more, spam messages to clients in a short period of time.

Current methods of detecting spam messages rely upon a messaging server examining the clear text of the spam message, examining the clear text version of any attachments to the message, and may also include examining an address of the sender.

Modern messaging services can encrypt message text from end-to-end. Thus, intermediate messaging servers cannot access the clear text of a message or its attachments to help determine whether the message is, or is not, spam.

SUMMARY OF THE DESCRIPTION

Systems and methods are disclosed for determining whether a message, including an encrypted message, is likely to be a spam message. When a client device receives a message, the client can create a signature of the message that consists of a series of elements that can take on some number of discrete values. Each of the elements in this signature can be referred to as a chunk of the original message. All clients receiving messages from a sender for the first time, or senders that are unknown to the user, can calculate the chunks of the message, run a locally differentially private algorithm on the chunks and send the results of the differentially private algorithm to a server ("crowdsourced data"). The server can accumulate aggregated features (e.g. frequencies of chunks) from the crowdsourced data. The differentially private aggregates accumulated by the server are estimates of the true aggregates in the messages system. These estimates can be transmitted to clients and the client can determine how likely the message received by the client is to be spam. Alternatively, the estimates can be encrypted homomorphically and the client can run a spam likelihood calculation homomorphically using the message chunks and encrypted estimate. The server can decrypt the result of this calculation and transmit it back to the client. The client device can take an appropriate action based on the calculated spam likelihood. If the message has a high likelihood of being spam, the message can be quarantined and the user notified accordingly. In an embodiment, the sender of the message can be added to a blacklist on the client device. In an embodiment, the user can approve, or disapprove, quarantining of the message and/or blacklisting of the sender. A prompt can be presented to ask the user whether the message should be quarantined. A prompt and additionally, or alternatively, be presented to ask the user whether the message and sender should be reported as spam. In embodiment, the client can check a contacts database on the client to determine whether the sender is a known, safe sender, or whether the sender may be previously indicated as a suspect sender or a known spam sender.

In an embodiment, a client can receive a message from a message server. If the message is encrypted, the client can decrypt the message. The client can then break the message into chunks and apply a locally differentially private algorithm to the message chunks and transmit the results to a server. The client can receive aggregated information from this server. Aggregated information can include e.g. a way to determine the global frequency value for each message chunk in the message without sending that chunk to the server, where a "global frequency value" is the frequency of a particular chunk in the entire messaging system. In an embodiment, aggregated information can include a frequency estimate for all chunks of the message. The client can analyze the received frequency estimates and apply an algorithm to determine whether the received message is likely to be spam. An appropriate action can be taken by the client to process the message based on the calculated spam likelihood.

In an embodiment, a server can receive the results of a locally differentially private algorithm run over the chunks of a message from a client. The server can aggregate these results from a large plurality of clients ("crowdsourced data"). The server can estimate e.g. a frequency for each message chunk in the messaging system and return to the client an estimator for the frequencies of message chunks. The client can use this estimator to determine the frequency data for a particular message and then use this information to calculate the likelihood of the message being spam.

In an embodiment a non-transitory computer readable medium can store executable instructions, that when executed by a processing system, can perform any of the functionality described above.

In yet another embodiment, a processing system coupled to a memory programmed with executable instructions can, when the instructions are executed by the processing system, perform any of the functionality described above.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
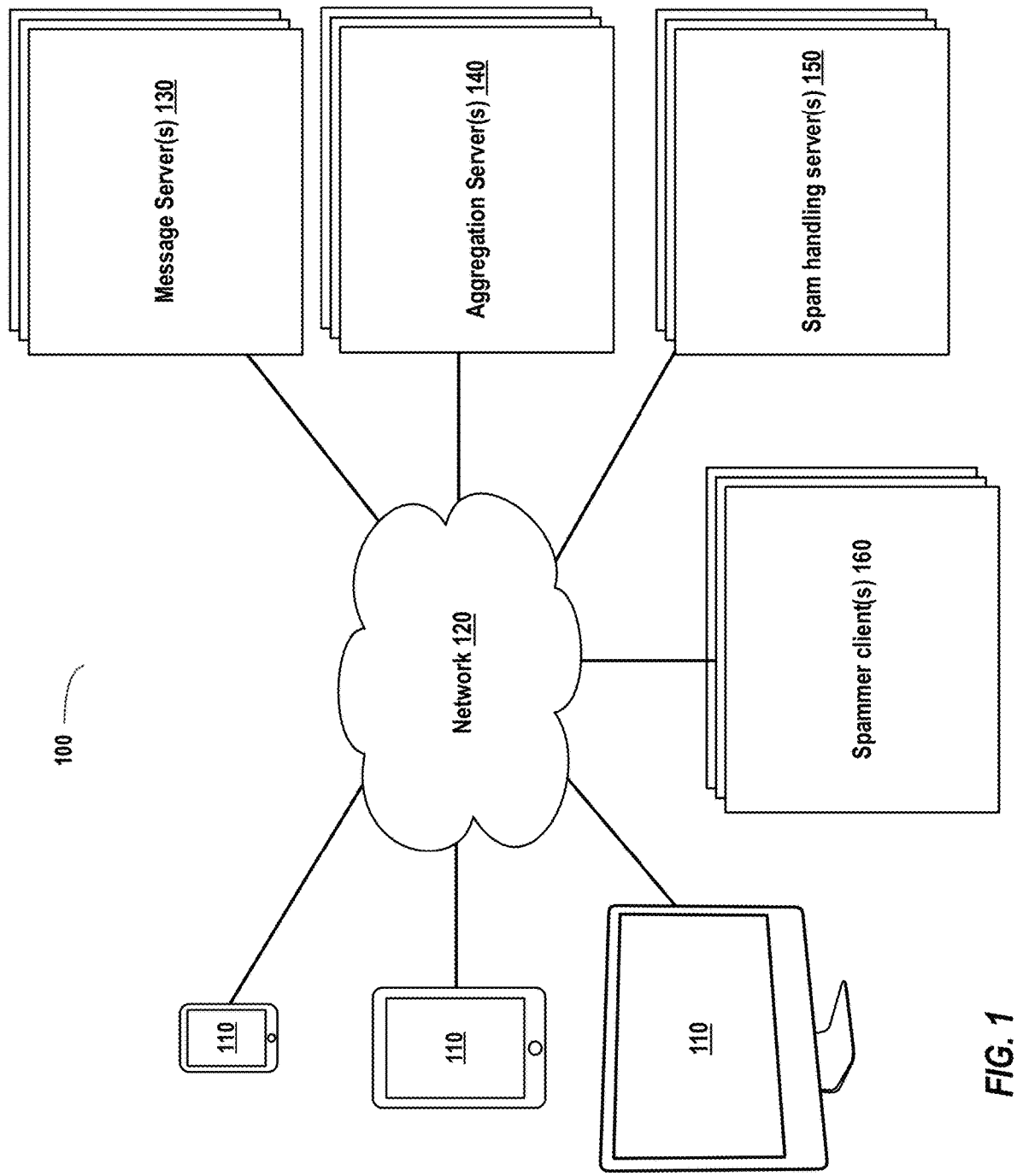
FIG. 1 illustrates, in block form, an overview of a system that detects spam messages using aggregate estimates derived from a locally differentially private algorithm delivering results from a large plurality of clients to a server according to some embodiments. The server makes the aggregate estimates available to all clients.

Systems and methods are disclosed herein for determining whether a message, including an encrypted message, is likely to be a spam message. When a client device receives a message, the client can create a signature of the message that consists of a series of elements that can take on some number of discrete values. Each of the elements in this signature is representative of a chunk of the original message. All clients receiving messages from a sender for the first time, or senders that are unknown to the user, can calculate the chunks of the message, run a locally differentially private algorithm on the chunks, and send the results of the differentially private algorithm to a server ("crowdsourced data"). The server can accumulate aggregated features (e.g. frequencies of chunks) from the crowdsourced data. The differentially private aggregates accumulated by the server are estimates of the true aggregates in the messages system. These estimates can be transmitted to clients and the client can determine how likely the message received by the client is to be spam. In one embodiment the server can encrypt the estimates using homomorphic encryption and send the encrypted estimates to the client. The client can then run a spam likelihood calculation homomorphically using the message chunks and encrypted estimate. The client device can take an appropriate action based on the calculated spam likelihood. If the message has a high likelihood of being spam, the message can be quarantined and the user notified accordingly.

In an embodiment, a client can receive a message from a message server. If the message is encrypted, the client can decrypt the message. The client can then break the message into chunks and apply a locally differentially private algorithm to the message chunks and transmit the results to a server. The client can receive aggregated information from this server that can include, for example, a way to determine the global frequency value for each message chunk in the message without sending that chunk to the server, where a "global frequency value" is the frequency of a particular chunk in the entire messaging system. In an embodiment, aggregated information can include a frequency estimate for all chunks of the message. The client can analyze the received frequency estimates and apply an algorithm to determine whether the received message is likely to be spam. An appropriate action can be taken by the client to process the message based on the calculated spam likelihood.

In an embodiment, a server can receive the results of a locally differentially private algorithm run over the chunks of a message from a client. The server can aggregate these results from a large plurality of clients ("crowdsourced data"). The server can estimate e.g. a frequency for each message chunk in the messaging system and return to the client an estimator for the frequencies of message chunks. The client can use this estimator to determine the frequency data for a particular message and then use this information to calculate the likelihood of the message being spam.

In one embodiment the server can encrypt the estimator using homomorphic encryption and send the encrypted estimator to a recipient client device, the recipient client device having received a message. The server can also send the public key used for homomorphic encryption. The recipient client device can compute a differential privacy hash for each chunk, encrypt the chunks using the homomorphic encryption public key, and compute the frequency of each chunk, while each chunk remains encrypted. The recipient client device can then send the encrypted frequencies of each chunk in a message to the server. The server can apply analytics to determine if enough chunks of the message have a frequency above a certain threshold to deem the message "spam." The server can then transmit the spam suspicion to the client, which can take appropriate action. In one embodiment, the server can receive a public homomorphic encryption key from a client.

In an embodiment, the sender of a spam message can be added to a blacklist on the client device. In an embodiment, the user can approve, or disapprove, quarantining of the message and/or blacklisting of the sender. A prompt can be presented to ask the user whether the message should be quarantined. A prompt and additionally, or alternatively, be presented to ask the user whether the message and sender should be reported as spam. In embodiment, the client can check a contacts database on the client to determine whether the sender is a known, safe sender, or whether the sender may be previously indicated as a suspect sender or a known spam sender.

Some embodiments described above, and further described herein, make use of homomorphic encryption. Homomorphic encryption is an encryption technique that enables computations to be carried out on the encrypted data (e.g., ciphertext), such that computations performed on the ciphertext will output a result which, when decrypted matches the result of operations performed on the unencrypted data (e.g., plaintext). As applied herein, homomorphic encryption allows analysis to be performed on encrypted chunks of messages without exposing the contents of those messages.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

The present disclosure recognizes that the use of personal information data collected from a large population of users, in the present technology, can be used to the benefit of all or many users while still maintaining the privacy of individual users. For example, the portions of messages that are learned from crowd sourced data can be used to detect spam messages so that a message service can identify senders of spam. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

The processes and operations depicted in the figures that follow can be performed via processing logic that includes hardware (e.g. circuitry, dedicated logic, etc.), software (as instructions on a non-transitory machine-readable storage medium), or a combination of both hardware and software. Although some of the processes are described below in terms of sequential operations, it should be appreciated that some of the operations described may be performed in a different order. Moreover, some operations may be performed in parallel rather than sequentially. Additionally, some operations may be indicated as optional and are not performed by all embodiments.

FIG. 1 illustrates, in block form, an overview of a system 100 that detects spam messages using aggregate estimates derived from a locally differentially private algorithm delivering results from a large plurality of clients to a server, according to some embodiments. The server makes the aggregate estimates available to all clients.

The system 100 can comprise a large plurality of client devices 110 coupled to message server(s) 130, aggregation server(s) 140 and spam handling server(s) 150, via network 120. Spammer clients 160 send messages to client devices 110 via message server(s) 130 across network 120. Client device 110 can comprise a desktop computer, such as an Apple® iMac®, a tablet computer, such as an Apple® iPad®, or other computing device 110 as described below with reference to FIG. 13.

Client device 110 can comprise a plurality of messaging applications. In an embodiment, one or more messaging applications can utilize end-to-end encryption. Client device 110 can also include one or more contacts and messages databases that can be used to determine whether a sender of a message that may or may not be spam has been sent by a sender that is known to the user. A sender can be determined to be known to a user when, for example, the sender appears in a contact list of the user. The contact list of the user can be stored on a client device 110 or on a remote server associated with the user and/or client device 110. If the sender is not known to the user, then client device 110 can invoke logic to determine whether the message is likely to be a spam message.

Network 120 can be any type of network, such as Ethernet, Token Ring, Firewire, USB, Fibre Channel, or other network type.

Message server(s) 130, aggregation server(s) 140, and spam handling server(s) 150 can be any type of server as described below with reference to FIG. 13. Message server(s) 130 can receive any type of message, including but not limited to email, text messages, SMS messages, encrypted messages, and other types of messages. In an embodiment, message server 130 comprises an Apple® iMessage® server. A user of a client device 110 can have an account on a message server 130. Client device 110 can having a plurality of messaging applications that connect to a message server 130 via network 120 to retrieve messages to the client device 110 for viewing and other actions.

Aggregation server(s) 140 can receive differentially private sketches of messages received from a large plurality of client devices 110 ("crowdsourced data"). Aggregation server(s) 140 can aggregate the received differentially private sketches of messages. Aggregation server 140 can include a frequency determination module. In an embodiment, frequency determination module can provide aggregates of differentially private algorithm results to a client. In an embodiment, frequency determination module can use aggregates of differentially private algorithm results received from a client device to determine an action for the client device to take based on aggregated differentially private algorithm results received from the client. In an embodiment, an aggregate frequency of differentially private algorithm results of a message can be returned to client device 110. In an embodiment, an aggregate frequency of all differentially private algorithm results of the message can be returned to client device 110. In an embodiment, frequency determination module can use homomorphic encryption to prevent an attacking client from determining frequencies of message chunks.

In an embodiment, if a client device 110, or aggregation server 140, determines that a message is likely to be spam, client device 110 can auto-report the message as spam to spam handling server 150. Alternatively, a user of client device 110 can indicate that a received message is spam. Spam handling server(s) 150 can store the differentially private algorithm results of the spam message with an indication that the stored differentially private algorithm results represent a spam message. In an embodiment, the clear text of the spam message can be stored instead of, or in addition to, the differentially private algorithm results comprising the spam message. In an embodiment, an address of the sender, keywords of the message, and other message meta data can be stored by spam handling server 150.

Spammer clients 160 can be any type of computing device, as described below with respect to FIG. 13, coupled to network 120. Spammer clients transmit the same spam message to a large number of addresses used by messaging applications on client devices 110. The high quantity of the same spam message sent by a single sender, or multiple senders, increases the count of differentially private algorithm results aggregated by aggregation server 140.

Figure 2:
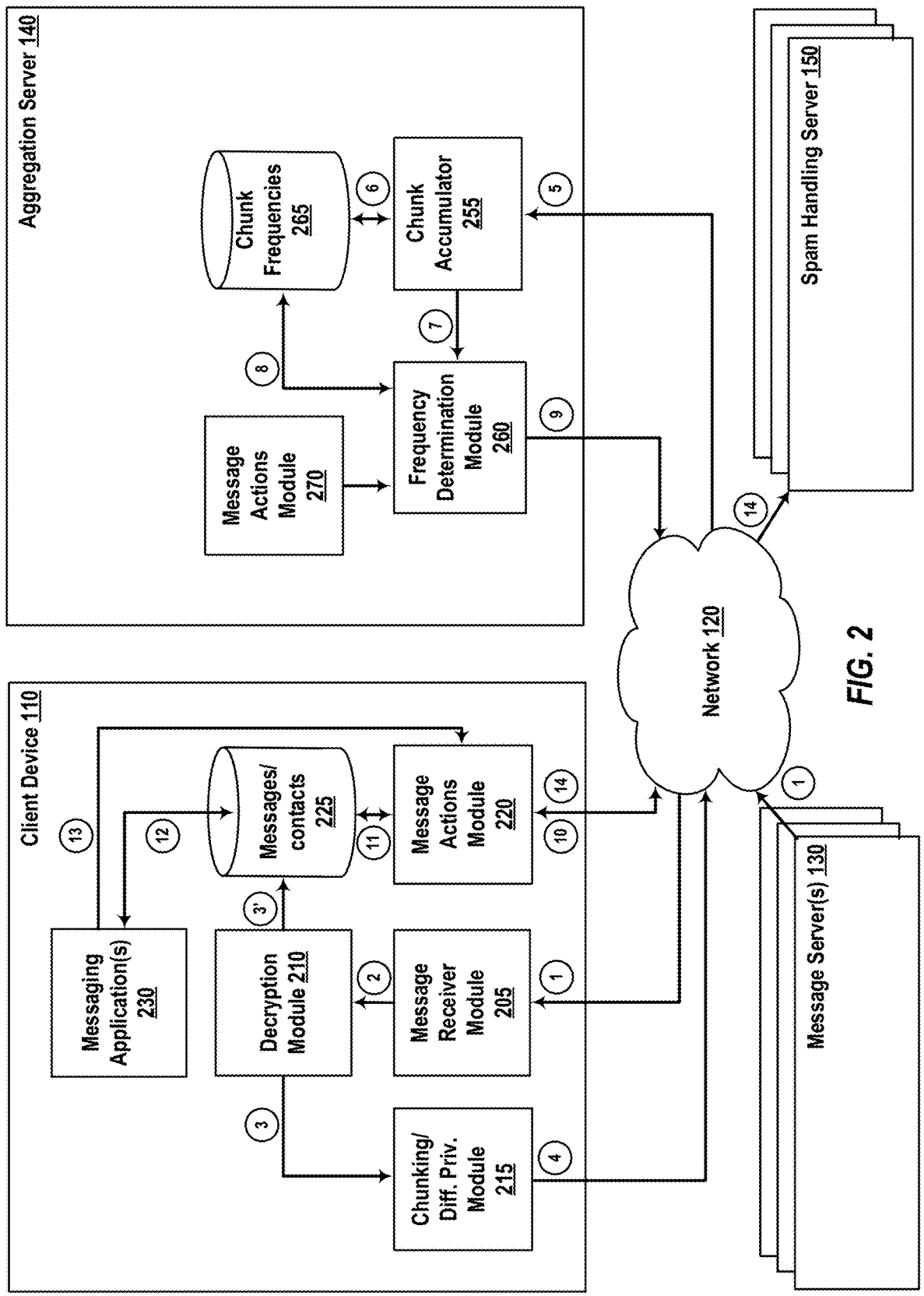
FIG. 2 illustrates, in block form, internal components of a client device and a aggregation server in a system that collects message features using differentially private algorithm results from a large plurality of clients and delivers those features to clients for spam determination according to some embodiments.

FIG. 2 illustrates, in block form, internal components of a client device 110 and an aggregation server 140 in a system that collects message features using differentially private algorithm results from a large plurality of clients and delivers those features to clients for determining a likelihood that a message received by the client is spam, according to some embodiments.

Internal components of client device 110 can include message receiver module 205, decryption module 210, chunking/differential privacy module 215, message actions module 220, message/contacts database 225, and messaging application(s) 230. In an embodiment, functionality of client device 110 modules can be implemented using one or more daemons, application programming interfaces (APIs), frameworks, libraries and the like. APIs are described in detail, below, with reference to FIG. 12.

Message receiver module 205 can receive (1) any type of message that is directed to message applications 230 on client device 110. Message receiver module 205 can pre-process a received message, including examining the sender, or any metadata of the message. Message receiver module 205 can pass (2) the sender, metadata, and message to decryption module 210. If the message is encrypted, then decryption module 210 can decrypt the message. Decryption module 210 can access message/contacts database 225 (3') to determine whether the sender of a received message is known to the user. In an embodiment, a sender is known to the user if the sender is found in the message/contacts database 225. In an embodiment, the sender is known to the user if the sender is found as a recipient, sender, or is found in the body text of a message in the messages/contacts database 225. In an embodiment, if the sender is known to the user, then a received message can be forwarded (3') to message/contacts database 225 and forwarded (12) to an appropriate messaging application 230. If the sender is not known to the user, then decryption module 210 can forward (3) the decrypted message to chunking/differential privacy (C/DP) module 215.

C/DP module 215 can break the clear text of the messages into a set of chunks, where a chunk is one or more characters of the message or other data that is representative of at least a portion of the message. In one embodiment, the chunking process can be applied in a deterministic, but not semantically meaningful manner. In one embodiment, the chunking process is non-deterministic, but reproducible, for a given sequence of input text. The size of each chunk need not be fixed in length. In an embodiment, C/DP module 215 can chunk a message according to a predetermined chunk length. In one embodiment, C/DP module 215 can divide the message into a set of dynamically sized chunks. Where dynamically sized chunks are enabled, C/DP module 215 can break the message into chunks using a sliding window algorithm, although other message chunking algorithms can be used in different embodiments.

When applying a sliding window algorithm, C/DP module 215 can pass a sliding window over sequential portions of text of the message to generate a window section for the portion of text. A hash value can then be computed for each window section using a selected hash function. C/DP module 215 can compare the hash value of each window section to a predetermined value, which can be zero or any other predetermined value. In one embodiment the predetermined value can vary based on the selected hash function. The C/DP module 215 can begin a new message chunk when the hash value of a window section is equal to the predetermined value.

In an embodiment, C/DP module 215 can generate a signature for the message. During message generation, C/DP module 215 can apply a hash function to each message chunk to generate a series of discrete values that are representative of each determined chunk of the original message. The hash function applied to generate the value of each chunk can be selected from a number of potential hash functions, and is need not be the same function applied during message chunking. C/DP module 215 can then add a series of data elements to the signature of the message, where each data element includes a discrete value that is representative of a chunk of the message.

A differential privacy algorithm can be applied locally, on the client device, to the set of chunks. In various embodiments, different differential privacy algorithms can be used, and embodiments are not limited to any specific differential privacy algorithm. In an embodiment, the differential privacy algorithm can generate a sketch of this set of chunks. The sketch is an estimate or approximation the occurrence frequency of the chunk of the message. In an embodiment, the differential privacy algorithm can comprise computing an n-bit hash of a random chunk, such as a 128-bit hash. A probability function can select one or more bits from the 128-bit hash to generate a sparse vector that can represent the hash of the chunk. In an embodiment, the sparse vector can be represented as a 1-bit vector. The results of the differentially private algorithm on the chunks can then be sent (4) to chunk accumulator 255 on aggregation server 140.

Internal components of aggregation server 140 can include chunk accumulator 255, frequency determination module 260, chunk frequencies storage 265, and message actions module 270.

Chunk accumulator 255 can receive (5) differentially private message sketches from a large plurality of client devices 110. Chunk accumulator 255 can add the received sketch to the aggregation of all previously received differentially private message sketches. The differentially private aggregates are estimates of the true aggregates of message chunks in the message system. Chunk accumulator 255 can forward (7) a frequency vector W, which is a frequency oracle that includes a count for each differentially private message chunk in the message system, received from all client devices 110, to frequency determination module 260. Frequency determination module 260 can return (9) the frequency vector W to client device 110. In an embodiment that uses homomorphic encryption, frequency determination module 260 can analyze the frequencies of all chunks in a message received on a client without learning the content of the message and return an action to client message actions module 220 for processing the received message. Aggregation server 140 message actions can include notifying the client device 110 that the message is almost certainly spam; suggesting to the client device 110 that the message be reported as spam, warning the user that the message may be spam, or taking no action.

Message actions module 220 can receive (10) frequency vector W from frequency determination module 260. Message actions module 220 can use frequency vector W to determine counts of message chunks of a message received by client device 110. Message actions module 220 can use the determined counts of message chunks to determine whether the received message is likely to be a spam message and take an appropriate action. In an embodiment, message actions module 220 analyzes the determined counts of message chunks to generate a spam score which is a composite or aggregate score for the message. In an embodiment, the aggregate spam score has a scale such as 0 . . . 10. In an embodiment, determining a spam score for a message can comprise finding a maximum frequency among the differentially private chunks of the message, finding a minimum frequency among the chunks of the message, finding an average frequency among all chunks of the message, finding various quantiles of message chunk frequency, and generating an aggregate score for the entire message. In an embodiment, if a message has an aggregate score less than a low threshold, e.g., 3, then the message is not likely to be spam. If a message has an aggregate score of more than a high threshold, e.g., 7, then the message is likely to be spam. Otherwise, the message may be determined as "suspect," indicating that the message is possibly includes a spam message. Message actions module 220 can then act upon the message based on the score. Other scales and numerical analysis methods are contemplated. The determination of whether a message is, or is not, spam may also be based at least in part on whether the sender is known to the user. A sender may be known to the user, but the message may still be spam, based on the aggregate score generated from the frequency determination information. A message from a known sender may be spam when, e.g., the known sender's message account has been hacked.

Message actions can include auto-reporting a message as spam, such as when the count of differentially private message chunks is above a high threshold or aggregate score are very high, e.g. 9 or 10 on a scale of 0 . . . 10. In an embodiment, a message with an aggregate score above a high threshold, e.g. 7, may be auto-quarantined with a message or other indication to the user of the action. In an embodiment, message actions module 220 may allow a message with an aggregate score of, e.g. 3 or lower, to be sent (11, 12) to message/contacts database 225 and/or sent (13) to message application 230. In an embodiment, if the frequencies of message chunks are, or the aggregate score is, above a low threshold and below a high threshold, a user may be prompted to select an action, such as "view message," "quarantine message," "preview message," "report message," or other action. If message action module 220 determines that a message is likely to be spam, or a user specifically selects "report spam," then the clear text of the message can be sent (14) to spam handling server 150.

Figure 3:
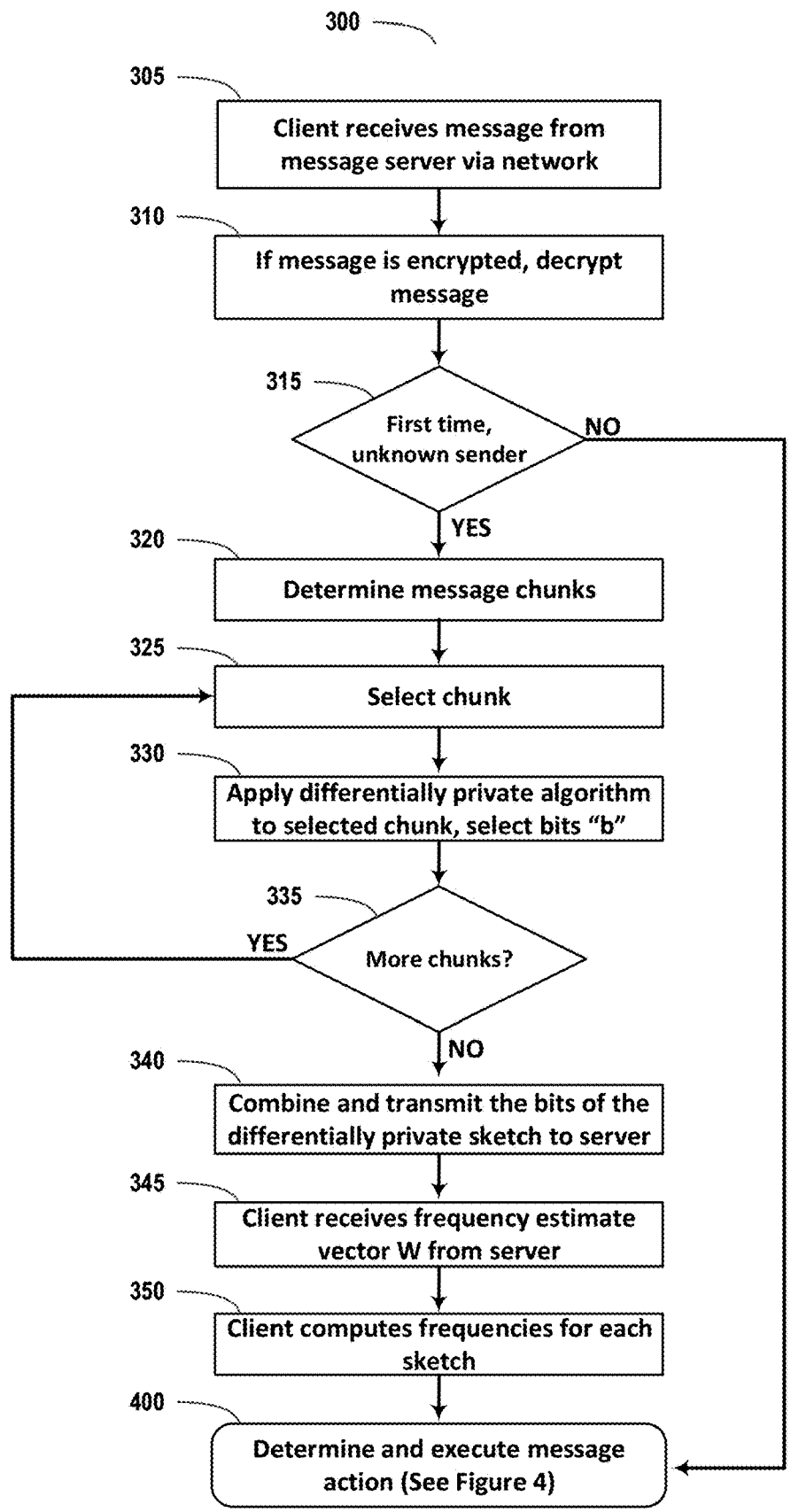
FIG. 3 illustrate a method of a client processing a message in a system that detects spam messages using aggregates of differentially private algorithm results from a large plurality of clients according to some embodiments.

FIG. 3 illustrates a method 300 of a client device 110 processing a message in a system that detects spam messages using aggregates of differentially private algorithm results from a large plurality of clients according to some embodiments.

In operation 305, client device 110 receives a message at message receiver module 205 from a message server 130 via network 120.

In operation 310, if the message is encrypted, the message can be decrypted by decryption module 210.

In operation 315, it can be determined whether the sender is a "first time," or "unknown" sender to the user of client device 110. In an embodiment, a sender is known if the sender's address or other identifying information is found in a messages/contacts database 225, if the sender is found as a sender or recipient in a message in the messages/contacts database 225, or if the sender is found or otherwise identified within the body text or subject text of one or more messages in messages/contacts database 225.

If, in operation 315, the sender is known to the user, then the method resumes at operation 400. Otherwise the method 300 resumes at operation 320.

In operation 320, when a client device receives a message, the client device can create a signature of the message that consists of a series of elements that can take on some number of discrete values. Each of the elements in this signature can be referred to as a chunk of the original message. C/DP module 215 can divide the decrypted message into a set of chunks on client device 110.

In operation 325, a first chunk can be selected from the set of chunks of the message.

In operation 330, C/DP module 215 can apply a differentially private algorithm to the selected chunk, to generate a differentially private sketch. In an embodiment, a random function can select "b" bits from the differentially private sketch to transmit to aggregation server 140.

In operation 335, C/DP module 215 can determine whether there are more chunks of the message to process. If so, the method 300 resumes at operation 325. Otherwise, the method 300 resumes at operation 340.

In operation 340, C/DP module 215 can combine and transmit the bits of the differentially private sketch to aggregation server 140.

In operation 345, client device 110 can receive the frequency vector W from aggregation server 140. In an embodiment, operation 345 can alternatively be performed before performing chunking operations 320, 325, 335, and 340. In other words, the client device 110 can receive the frequency vector W from aggregation server 140 before determining the message chunks and/or before transmitting bits of the differentially private sketch to the aggregation server 140.

In operation 350, client device 110 can compute frequencies for each chunk of the message using frequency vector W received from aggregation server 140.

In operation 400, a message action can be determined by message actions module 220 of client device 110 based at least in part on the frequency determination information received from aggregation server 140. Operation 400 is described below with reference to FIG. 4.

Figure 4:
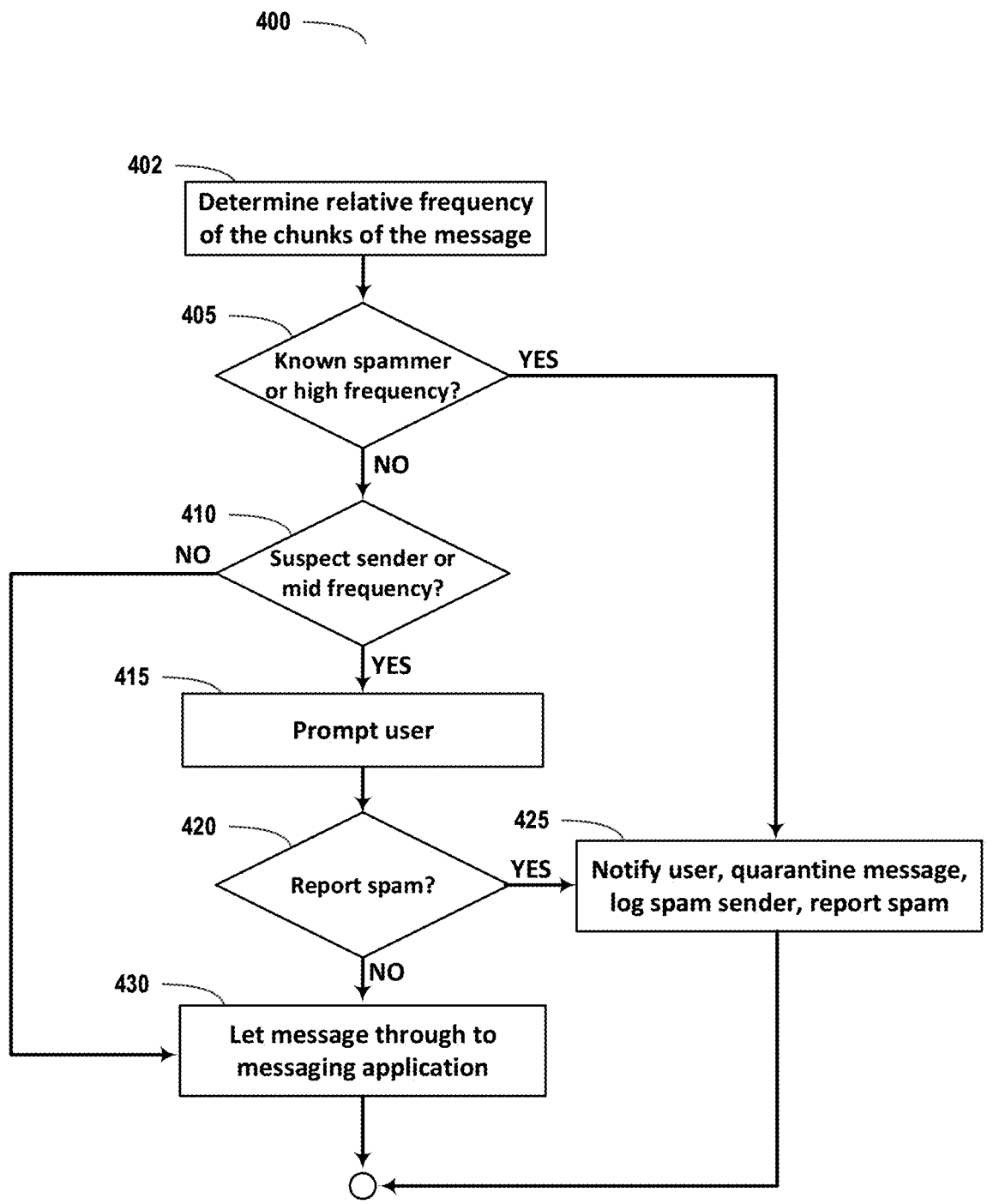
FIG. 4 illustrates a method of a client determining an action for processing a message using aggregates of differentially private algorithm results from a large plurality of clients according to some embodiments.

FIG. 4 illustrates a process for operation 400 performed on client device 110, according to an embodiment described herein. In one embodiment, operation 400 is performed to determine an action for processing a message within a system that uses aggregated differentially private results from a large number of clients. The specific illustrated actions and sub-operations of operation 400, are exemplary of one or more embodiment, but are not limiting as to all embodiments.

In sub-operation 402, message actions module 220 can use the aggregated frequency vector W of message chunks from a large plurality of clients in the message system to determine relative frequencies of the chunks of the message received by the client device 110. Frequency determination module 260 can provide threshold values for high and low message chunk frequencies that may indicate that a message is, or is not, spam.

In sub-operation 405, it can be determined whether the sender is a known spammer or the count of chunks received by client device 110 from aggregation server 140 indicates a high frequency of a substantial number of the message chunks, above a high threshold. For example, a high threshold can be a value such as 70% of the message chunks of a message being above a count of 10,000. A sender can be determined to be a known spammer by a client device 110 having previously quarantined one of the sender's messages, or a user of the client device 110 having previously reported a message from the sender as spam. In an embodiment, client device 110 can request a determination from spam handling server 150 whether the sender is a known spammer.

If, in sub-operation 405, it is determined that the sender is a known spammer or the count of chunks indicates a high frequency, then operation 400 resumes at sub-operation 425, described below. Otherwise, operation 400 resumes at sub-operation 410.

In sub-operation 410, it can be determined whether the sender is a "suspect" sender or the count of message chunks indicates a mid-frequency for the chunks of the received message. A sender may be suspect if an analysis of the sender's address indicates that the sender is likely sending from a country, domain name, or location that is known for originating spam. A sender may be suspect if the sender's address is in a language of a country that is different from the user of the client device 110 receiving the message being analyzed for whether it is spam. A frequency is mid-frequency if a substantial number of the chunks have a frequency that is less than a high threshold and greater than a low threshold. Mid-frequency can indicate the early stages of client devices beginning to receive a spam message that may quickly grow to a high frequency. A mid-frequency can be, e.g., if 70% of the differentially private message chunks in a received message have a frequency less than a high threshold of, e.g. 10,000, and a frequency that is greater than a low threshold, e.g. 100 for a population sample size of messages of, e.g, 250,000. A low frequency of 100, may indicate a benign message, or a trending topic, or an extensive conversation or chat among a number of users of client devices 110.

If, in sub-operation 410, it is determined that the sender is not suspect or the count of chunks indicates a low frequency, then the operation 400 resumes at sub-operation 430. Otherwise the operation 400 resumes at sub-operation 415.

In sub-operation 415, the user can be prompted for an action to take. In FIG. 4, a simplified set of actions is described wherein the user either lets a message through or reports the message as spam. A preview of a message can be presented in conjunction with a message for the user to select an action to take regarding the message. An action may be to let the message through to the messages/contacts database 225 or to the messaging application 230 that is appropriate for the message type (text, email, etc.). An action can include reporting the message as spam to spam handling server 150, or storing the message in a quarantine folder on the client device 110.

In sub-operation 420, it can be determined whether the user has opted to report the suspect message as spam. If the user has opted to report the message as spam, then in sub-operation 425 the message can be quarantined on the client device 110, and a spam report can be sent to spam handling server 150. In an embodiment, when a user opts to report a message as spam, the clear text of the message, the sender address of the message, and any metadata of the message can be sent to spam handling server 150. In an embodiment, the client device 110 can log the sender as a known spammer in messages/contacts database 225 for future reference. An appropriate message can be generated to the user of the foregoing actions. If, in sub-operation 420 the user chooses the let the message through, then in sub-operation 430 message actions module 220 can pass the message to messages/contacts database 225 and/or to an appropriate message application 230 to present the message to the user.

Figure 5:
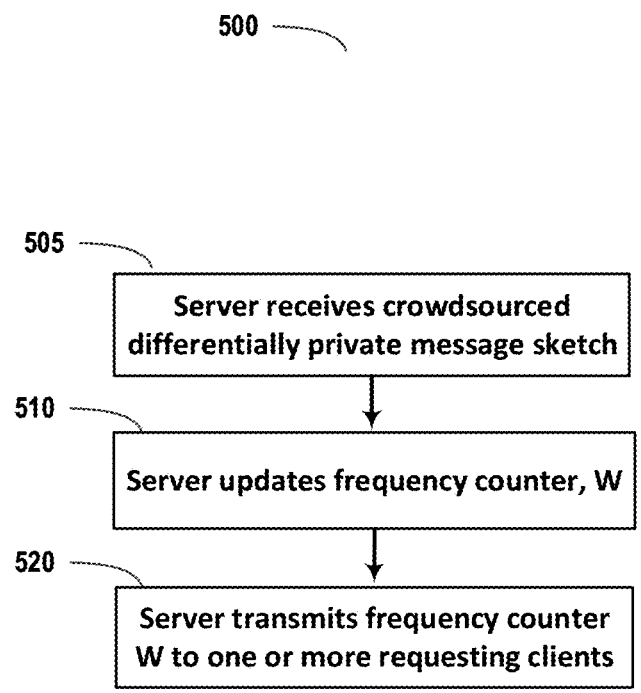
FIG. 5 illustrates a method of a server delivering aggregates of differentially private algorithm results to the client, in a system that detects spam messages using aggregates of differentially private algorithm results from a large plurality of clients according to some embodiments.

FIG. 5 illustrates a method 500 of an aggregation server 140 delivering aggregates of differentially private algorithm results to the client device 110, in a system that detects spam messages using aggregates of differentially private algorithm results from a large plurality of clients according to some embodiments.

In operation 505, aggregation server 140 chunk accumulator 255 can receive, from a client device 110, differentially private message sketches received from a large plurality of client devices.

In operation 510, chunk accumulator 255 can aggregate all the differentially private message sketches received from a large plurality of clients and produce an updated frequency vector W of differentially private message chunks received from the large plurality of client devices.

In operation 520, frequency determination module 260 can transmit the frequency vector W to one or more requesting client devices 110. In an embodiment, aggregation server 140 can transmit frequency vector W to a client device in response to the client device sending differentially private message sketches to aggregation server 140.

Figure 6:
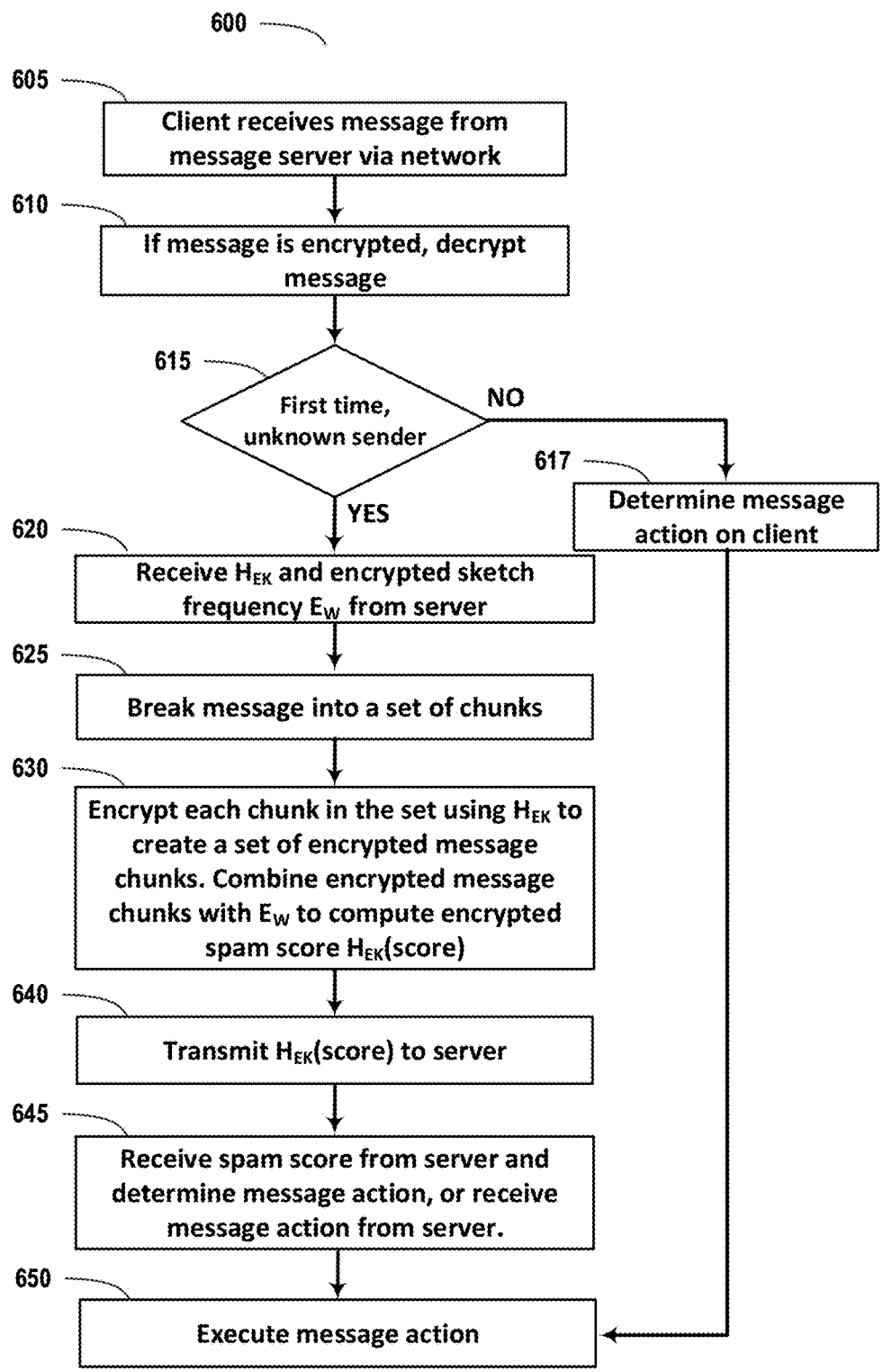
FIG. 6 illustrate a method of a client processing a message in a system that detects spam messages using aggregates of differentially private algorithm results from a large plurality of clients and involving and homomorphic encryption of those aggregates to remove the existence of a frequency oracle from the system, according to some embodiments

FIG. 6 illustrates a method 600 of a client processing a message in a system that detects spam messages using aggregates of differentially private algorithm results from a large plurality of clients and involving a homomorphic encryption of those aggregates to remove the existence of a frequency vector W (e.g., the frequency oracle) from the system, according to some embodiments. In method 600, client device 110 receives a homomorphically encrypted version of the frequency vector W. Thus, frequency vector W is not exposed to client device 110.

In operation 605, client device 110 can receive a message at message receiver module 205 from a message server 130 via network 120.

In operation 610, if the message is encrypted, the message can be decrypted by decryption module 210.

In operation 615, it can be determined whether the sender is a "first time," or "unknown" sender to the user of client device 110. In an embodiment, a sender is known if the sender's address or other identifying information is found in a messages/contacts database 225, if the sender is found as a sender or recipient in a message in the messages/contacts database 225, or if the sender is found or otherwise identified within the body text or subject text of one or more messages in messages/contacts database 225.

If, in operation 615, the sender is a first time or unknown sender to the user, then the method resumes at operation 620. Otherwise the method 600 resumes at operation 617.

In operation 617, client device 110 can determine a message action to take based upon the sender not being a first-time sender and not being an unknown sender to the client device 110 and method 600 resumes at operation 650.

In operation 620, client device 110 can receive from aggregation server 140 a public homomorphic encryption key, $H_{EK}$, and an encrypted frequency vector $E_W$, encrypted with public homomorphic encryption key, $H_{EK}$.

In operation 625, the decrypted message can be divided into a set of chunks by C/DP module 215 on client device 110.

In operation 630, each chunk can be encrypted using the public homomorphic encryption key, $H_{EK}$ to create a set of encrypted message chunks.

The same algorithm that is used to compute the spam score in message action module 220 can be implemented in a homomorphic encryption algorithm. The encrypted message chunks can be combined with the encrypted frequency vector $E_W$ in order to compute the encrypted spam score $H_{EK}$(score).

In operation 640, C/DP module 215 can transmit $H_{EK}$(score) to aggregation server 140.

In operation 645, client device 110 can receive a message from aggregation server 140 regarding an action for the client device 110 to take with respect to the message based in part on the $H_{EK}$(score) that was delivered to the server. The server can decrypt $H_{EK}$(score) using its homomorphic public key and so learn the spam score without learning the message content. An example message action is described below with reference to FIG. 10.

In an embodiment, in operation 645, client device 110 can receive a message spam score from aggregation server 140 and client device 110 message action module 220 can determine a message action to take based upon that score received from the aggregation server 140. In an embodiment, aggregation server 140 can return a spam likelihood score without disclosing a the frequencies of particular message chunks. Such an embodiment increases the difficulty of a spammer detecting how the aggregation server is processing the differentially private message chunks.

In operation 650, client device 110 can execute the message action.

Figure 7:
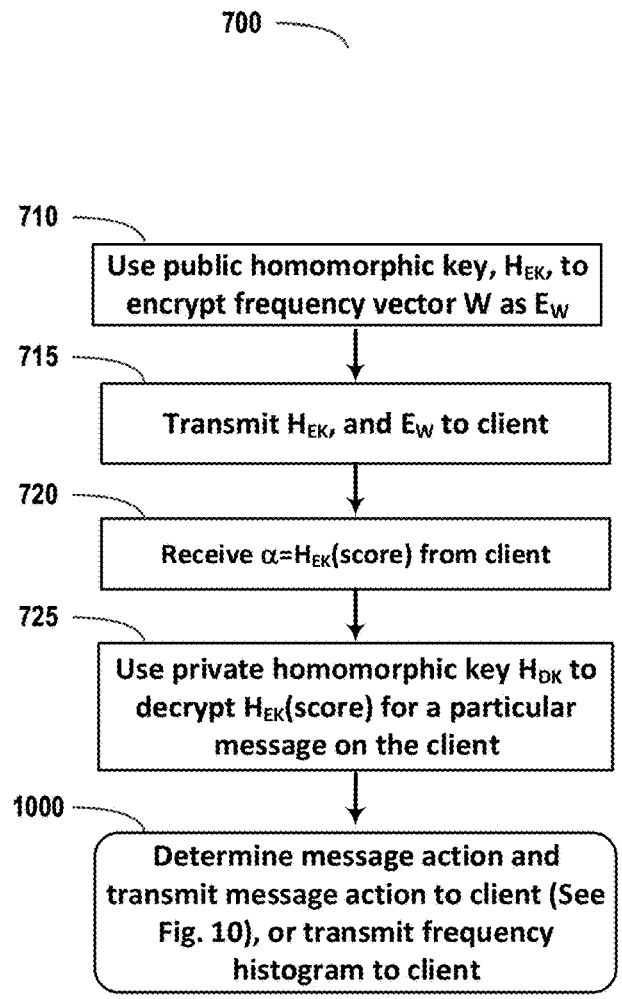
FIG. 7 illustrates a method of a server determining spam likelihood on behalf of a client from encrypted differentially private algorithm results received from the client, in a system that detects spam messages using aggregates of differentially private algorithm results from a large plurality of clients and involving homomorphic encryption of those aggregates to remove the existence of a frequency oracle from the system, according to some embodiments.

FIG. 7 illustrates a method 700 of a server determining spam likelihood on behalf of a client device 110 from encrypted differentially private algorithm results received from the client device 110, in a system that detects spam messages using aggregates of differentially private algorithm results from a large plurality of clients and involving homomorphic encryption of those aggregates to remove the existence of a frequency oracle from the system, according to some embodiments. A frequency vector W on aggregation server 140 stores estimates of the frequencies of all message chunks present in the messaging system from a large plurality of client devices 110 (crowdsourced data). Frequency vector W is retained on the aggregation server 140. A homomorphically encrypted version of the frequency vector, $E_W$, is transmitted to the client device 110, but not the unencrypted frequency vector W.

In operation 710, aggregation server 140 uses a public homomorphic encryption key, $H_{EK}$, to encrypt server frequency vector W as $E_W$.

In operation 715, aggregation server 140 transmits public homomorphic encryption key $H_{EK}$ and encrypted frequency vector $E_W$ to client device 110.

In response to operation 715, in operation 720, aggregation server 140 can receive from client device 110 a value a representing $H_{EK}$(score), wherein $H_{EK}$(score) is a spam score computed on the client device, encrypted using the public homomorphic encryption key $H_{EK}$.

In operation 725, aggregation server 140 can use private homomorphic decryption key $H_{DK}$ to decrypt $H_{EK}$(score) to obtain the spam score of a particular message on the client device.

In operation 1000, frequency determination module 260 can analyze the score to determine an action to send to the client device 110 for the message.

Operation 1000 is described in detail, below, with reference to FIG. 10. In an embodiment, aggregation server 140 can transmit the score of the message to client device 110 and client device 110 can use message actions module 220 to determine a message action to take based upon the score for the message. In an embodiment, only message scores above a threshold value are sent to the client device 110. In an embodiment, only a message action is transmitted to the client device 110.

Figure 8:
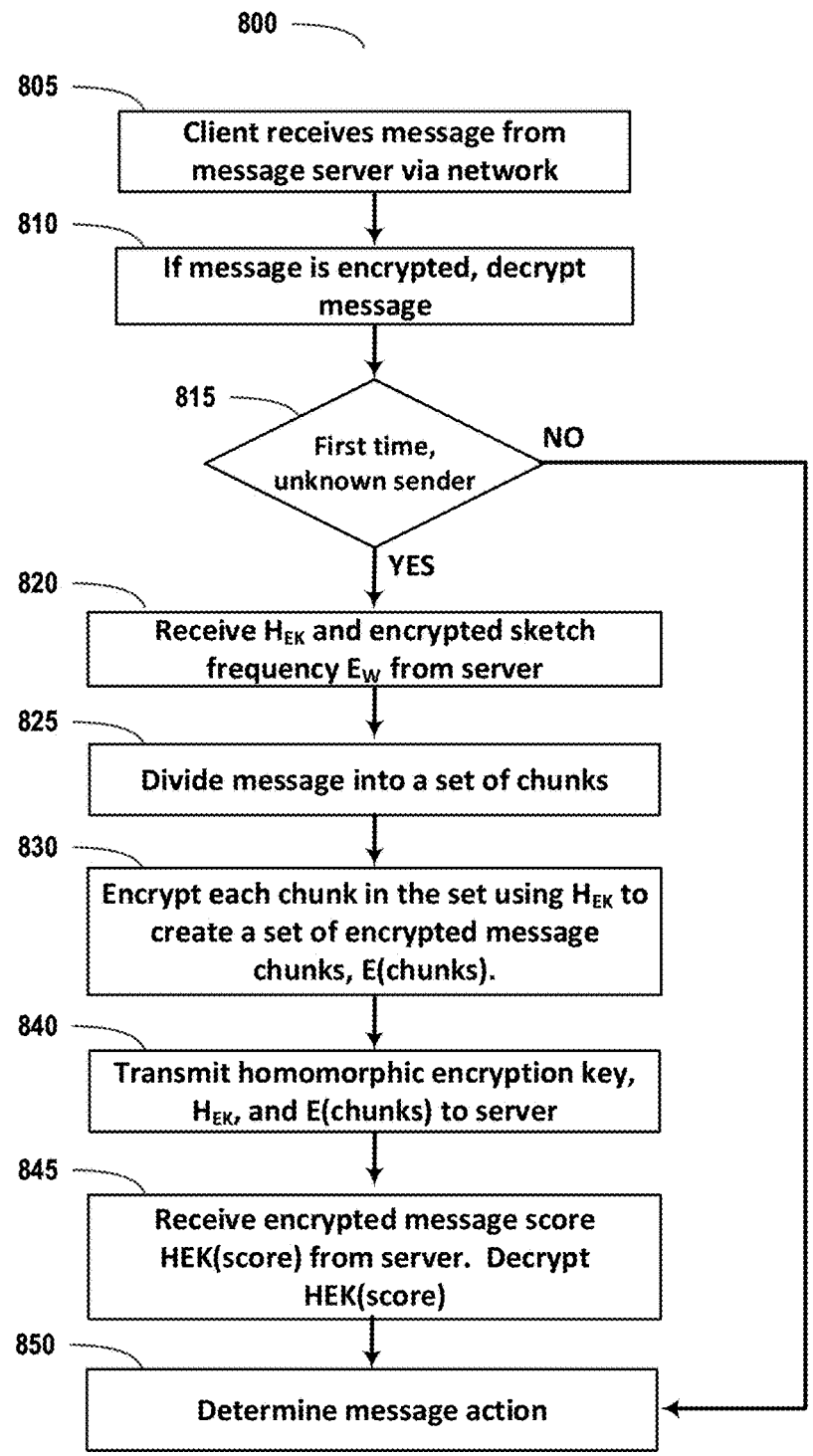
FIG. 8 illustrate a method of a client processing a message in a system that detects spam messages using aggregates of differentially private algorithm results from a large plurality of clients and involving and homomorphic encryption of those aggregates to remove the existence of a frequency oracle from the system, according to some embodiments

FIG. 8 illustrates a method 800 of a client processing a message in a system that detects spam messages using aggregates of differentially private algorithm results from a large plurality of clients and involving a homomorphic encryption of messages to remove the existence of a frequency oracle W from the system, according to some embodiments. In method 800, client device 110 receives a homomorphically encrypted spam score from the spam server. Thus, frequency vector W is not exposed to client device 110.

In operation 805, client device 110 can receive a message at message receiver module 205 from a message server 130 via network 120.

In operation 810, if the message is encrypted, the message can be decrypted by decryption module 210.

In operation 815, it can be determined whether the sender is a "first time," or "unknown" sender to the user of client device 110. In an embodiment, a sender is known if the sender's address or other identifying information is found in a messages/contacts database 225, if the sender is found as a sender or recipient in a message in the messages/contacts database 225, or if the sender is found or otherwise identified within the body text or subject text of one or more messages in messages/contacts database 225.

If, in operation 815, the sender is a first time sender or unknown to the user, then the method resumes at operation 820. Otherwise the method 800 resumes at operation 850.

In operation 825, the decrypted message can be divided into a set of chunks by C/DP module 215 on client device 110.

In operation 830, each chunk can be encrypted using the public homomorphic encryption key, $H_{EK}$ to create a set of encrypted message chunks E(chunks).

In operation 840, client device 110 can transmit to aggregation server 140 public homomorphic encryption key, $H_{EK}$, and the encrypted message chunk set H(chunk).

The aggregation server 140 can use the public homomorphic encryption key, $H_{EK}$ to compute the encrypted frequency vector $E_W$.

The same algorithm that is used to compute the spam score in message action module 220 can be implemented in a homomorphic encryption algorithm. The encrypted message chunks can be combined with the encrypted frequency vector $E_W$ in order to compute the encrypted spam score $H_{EK}$(score) on the aggregation server.

In operation 845, client device 110 can receive encrypted message score $H_{EK}$(score) from aggregation server 140, decrypt the score and pass the score the message action module 220. In an embodiment, aggregation server 140 can return a spam likelihood score without disclosing the frequencies of particular message chunks. Such an embodiment increases the difficulty of a spammer detecting how the aggregation server is processing the differentially private message chunks.

In operation 850, client device 110 message action module 220 can determine a message action to take based upon that score received from the aggregation server 140.

Figure 9:
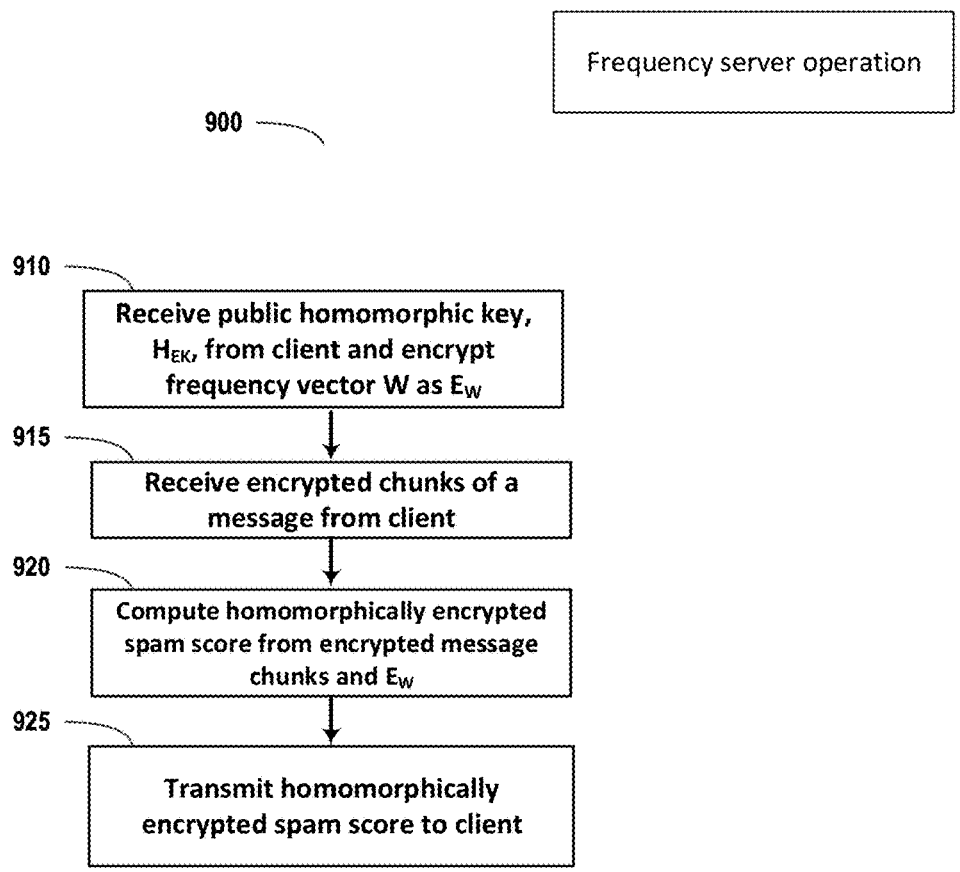
FIG. 9 illustrates a method of a server determining spam likelihood on behalf of a client from encrypted differentially private algorithm results received from the client, in a system that detects spam messages using aggregates of differentially private algorithm results from a large plurality of clients and involving homomorphic encryption of those aggregates to remove the existence of a frequency oracle from the system, according to some embodiments.

FIG. 9 illustrates a method 900 of a server determining spam likelihood on behalf of a client device 110 from encrypted differentially private algorithm results received from the client device 110, in a system that detects spam messages using aggregates of differentially private algorithm results from a large plurality of clients and involving homomorphic encryption of those aggregates to remove the existence of a frequency oracle from the system, according to some embodiments. A frequency vector W on aggregation server 140 stores estimates of the frequencies of all message chunks present in the messaging system from a large plurality of client devices 110 (crowd sourced data). Frequency vector W is retained on the aggregation server 140.

In operation 910, aggregation server 140 receives a public homomorphic encryption key, $H_{EK}$, from client device 110 to encrypt server frequency vector W as $E_W$.

In operation 915, aggregation server 140 receives encrypted chunks of a message from client device 110. In an embodiment the chunks were encrypted using the public homomorphic encryption key, $H_{EK}$, of client device 110.

In response to operation 915, in operation 920, aggregation server computes the homomorphically encrypted spam score from the encrypted message chunks and encrypted frequency estimator.

In operation 925, aggregation server 140 then transmits that encrypted spam score to client device 110. Client device 110 can then decrypt that score using its private key to find the spam score value.

Figure 10:
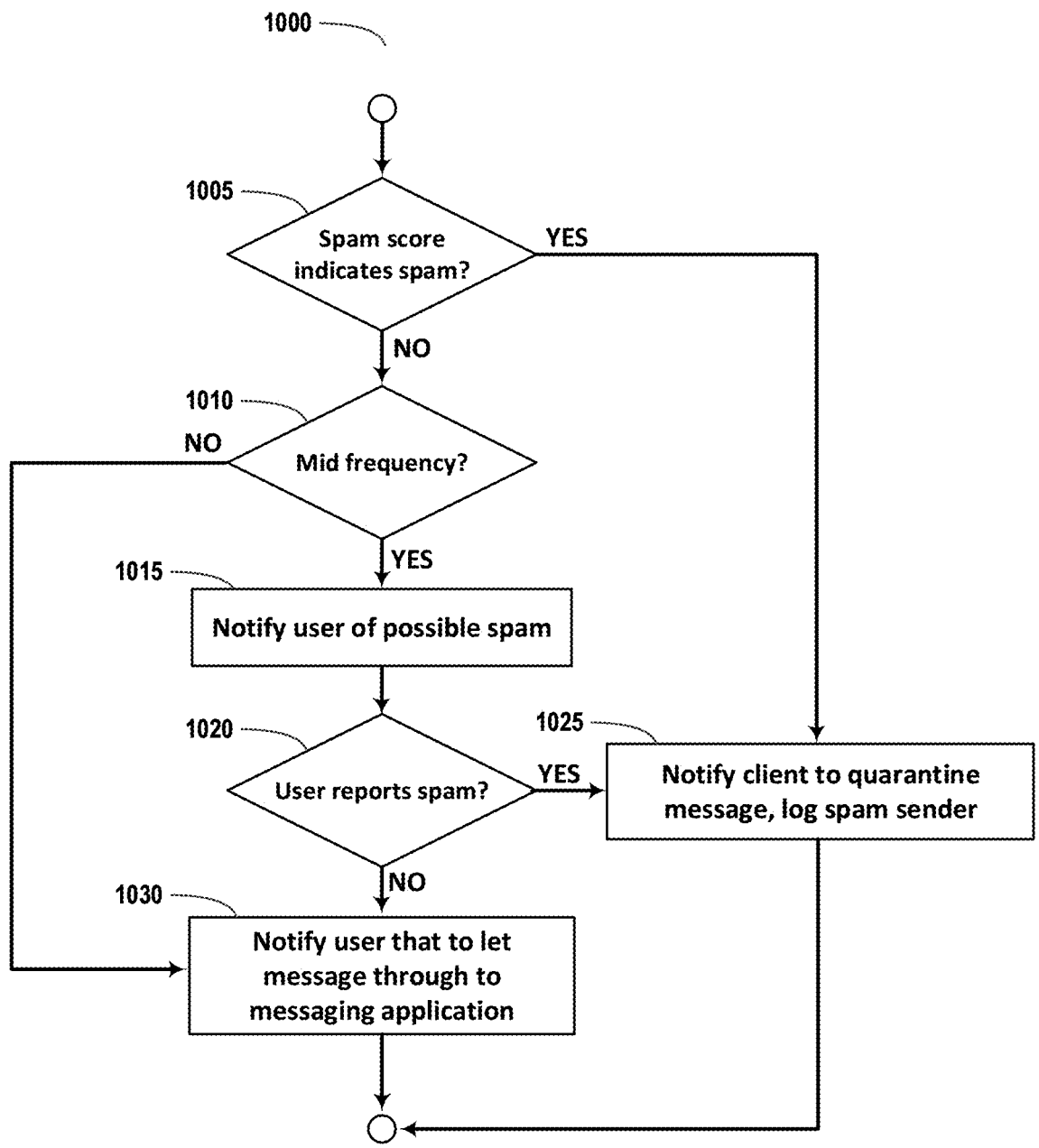
FIG. 10 illustrates a method of a server determining an action for a client to process a message using aggregates of differentially private algorithm results from a large plurality of client according to some embodiments.

FIG. 10 illustrates a process for operation 1000 on an aggregation server 140, according to an embodiment. Operation 1000 can determine an action for a client device 110 to process a message in a system that aggregates differentially private algorithm results from a large plurality of clients. In an embodiment, aggregation server 140 does not know the identity of the sender of a message processed by the aggregation server 140. Aggregation server 140 knows the frequency vector W, which contains a global frequency of message chunks as aggregated from multiple messages. In an embodiment, client device 110 could share the identity of the sender with the aggregation server 140. In such an embodiment, aggregation server 140 could implement logic that is substantially similar to that of FIG. 4, described above, for a client-side message action decision. FIG. 10 describes an embodiment wherein the identity of the sender of a message is not known to aggregation server 140.

If, in sub-operation 1005, it is determined whether the spam score of a received message indicates a high likelihood of spam. The likelihood of spam is high if a substantial number of messages with at or above this particular score above this are actually spam. For example, a high score might be calculated because 70% of the message chunks of a message have a count above 10,000. If so then the operation 1000 continues at sub-operation 1025, described below. Otherwise, the operation 1000 continues at sub-operation 1010.

In sub-operation 1010, it can be determined whether the aggregated count of the message chunks of the received message indicates a mid-frequency for the message chunks. A frequency is mid-frequency if a substantial number of the message chunks have a frequency that is less than a high threshold and greater than a low threshold. Mid-frequency can indicate the early stages of client devices beginning to receive a spam message that may quickly grow to a high frequency. A mid-frequency can be, e.g., if 70% of the differentially private message chunks in a received message have a frequency less than a high threshold of, e.g. 10,000, and a frequency that is greater than a low threshold, e.g. 100. A low frequency of 100, may indicate a benign message, or a trending topic, or an extensive conversation or chat among a number of users of client devices 110.

If, in sub-operation 1010, it is determined that the spam score indicates a low frequency, then the operation 1000 continues at sub-operation 1030. Otherwise the operation 1000 continues at sub-operation 1015.

In sub-operation 1015, the user can be notified that the message is possibly spam. In an embodiment, the user can be prompted for an action to take. In FIG. 10, a simplified set of actions is described wherein the user either lets a message through or reports the message as spam. A preview of a message can be presented in conjunction with a message for the user to select an action to take regarding the message. An action may be to let the message through to the messages/contacts database 225 or to the messaging application 230 that is appropriate for the message type (text, email, etc.). An action can include reporting the message as spam to spam handling server 150, or storing the message in a quarantine folder on the client device 110.

In sub-operation 1020, it can be determined whether the user has opted to report the suspect message as spam, such as via message received by aggregation server 140 from the client device 110. If the user has opted to report the message as spam, then in sub-operation 1025 the message can be quarantined on the client device 110, the aggregation server 140 can receive the clear text and sender of the message, and a spam report can be sent to spam handling server 150. In an embodiment, the client device 110 can log the sender as a known spammer in messages/contacts database 225 for future reference. An appropriate message can be generated to the user of the foregoing actions. If, in sub-operation 1020 the user chooses the let the message through, then in sub-operation 1030 message actions module 220 can pass the message to messages/contacts database 225 and/or to an appropriate message application 230 to present the message to the user.

Figure 11:
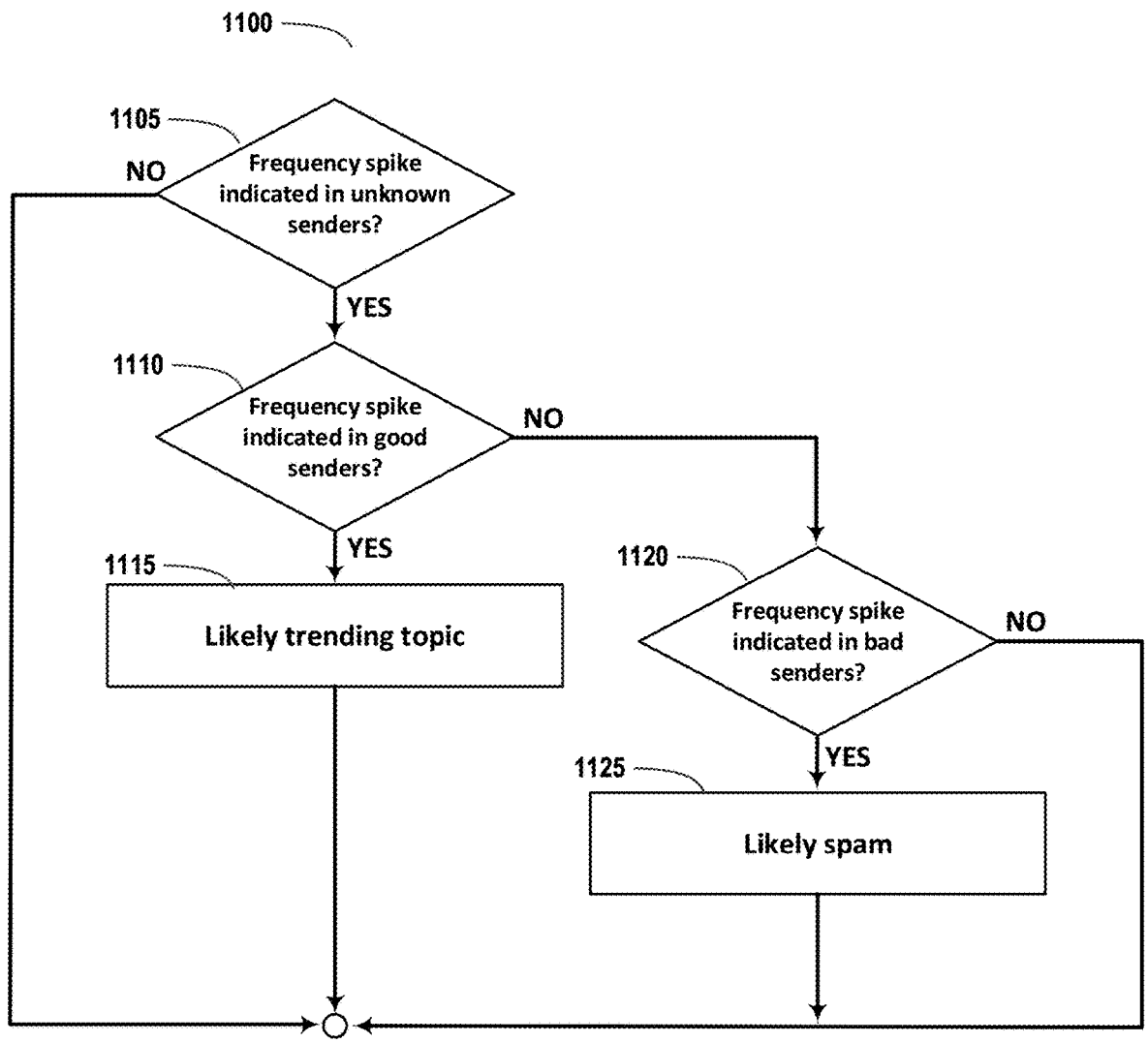
FIG. 11 illustrates a method of determining whether a change in chunk aggregates is likely due to spam, using control groups of senders, according to some embodiments.

FIG. 11 illustrates a method 1100 of determining whether a change in chunk aggregates is likely due to spam, using control groups of senders, according to some embodiments. Control groups of senders can include "good" senders, "unknown" senders, and "bad" or "spam" senders. When a user reports a message as spam, the message can be stored and the sender logged as a "bad" sender. A "good" sender comprises the largest portion of client devices. A good sender group can be generated from a list of senders that have previously reported spam and do also do not appear in the bad sender group. Good senders can also include senders that have been long-time members of an electronic service, such as messaging server like Apple® iMessage®, a music and software online store such as Apple® iTunes®, or an online application store such as Apple® AppStore. An unknown group of senders can be any or all senders that are not "good" senders or "bad" senders. Unknown senders are presumed to comprise mostly potentially good senders, as spammers are rare in comparison to the number of "good" users. Control group analysis looks to see if frequencies of a plurality of message chunks are experiencing a fast increase or "spike." A spike in frequencies of chunks in good users and unknown users, but not spammers, could indicate a trending topic. A spike in frequencies of chunks in spammers and unknown users, but not good users, could indicate an increase in spamming. The following is one example of how control groups can be used. Other embodiments are contemplated.

In operation 1105, it can be determined whether aggregation server 140 has detected a spike in frequency for a plurality of message chunks in the unknown senders. If there is a spike in frequencies of a plurality of differentially privately aggregated message chunks in the unknown senders, then method 1100 continues at operation 1110, otherwise method 1100 ends.

In operation 1110, if there is a spike in frequencies of particular message chunks for the good senders and a substantially similar frequency spike in the same message chunks for the unknown senders control group, then in operation 1115 it is likely that the spike is due to a trending topic. Otherwise, the method 11900 continues at operation 1120.

In operation 1120, if there is also a spike in frequency for a plurality of message chunks for the bad senders in a substantially similar plurality of chunks as that of the unknown senders control group, then in operation 1125 it is likely that the spike is due to an increase in spam. Otherwise, the method 1100 ends.

In the case of a likely trending topic, as in operation 1115, aggregation server 140 need not take any action. In the case of a likely spam surge, as in operation 1125, frequency server can take actions against the spam surge. For example, aggregation server 140 can notify one more message server(s) 130 of the message chunks that are experiencing a spike in frequency. Aggregation server 140 can flag one or more of the possible message chunks as likely being related to spam.

In an embodiment, aggregation server 140 can determine a combination of rules that determine whether a message is spam, in relation to each of the control groups. Additional rules can include generating control groups for geographic regions, particular for geographic regions known to generate a large amount of spam. In an embodiment, rules can include detecting a time of day of a spike in a control set. For example, spammers may tend to generate spam after business hours. Correlation of frequency spikes in control groups to geographic locations, and/or time of day can be detected using machine learning techniques such as linear regression, Bayesian analysis or naive Bayes, and other machine learning algorithms.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Figure 12:
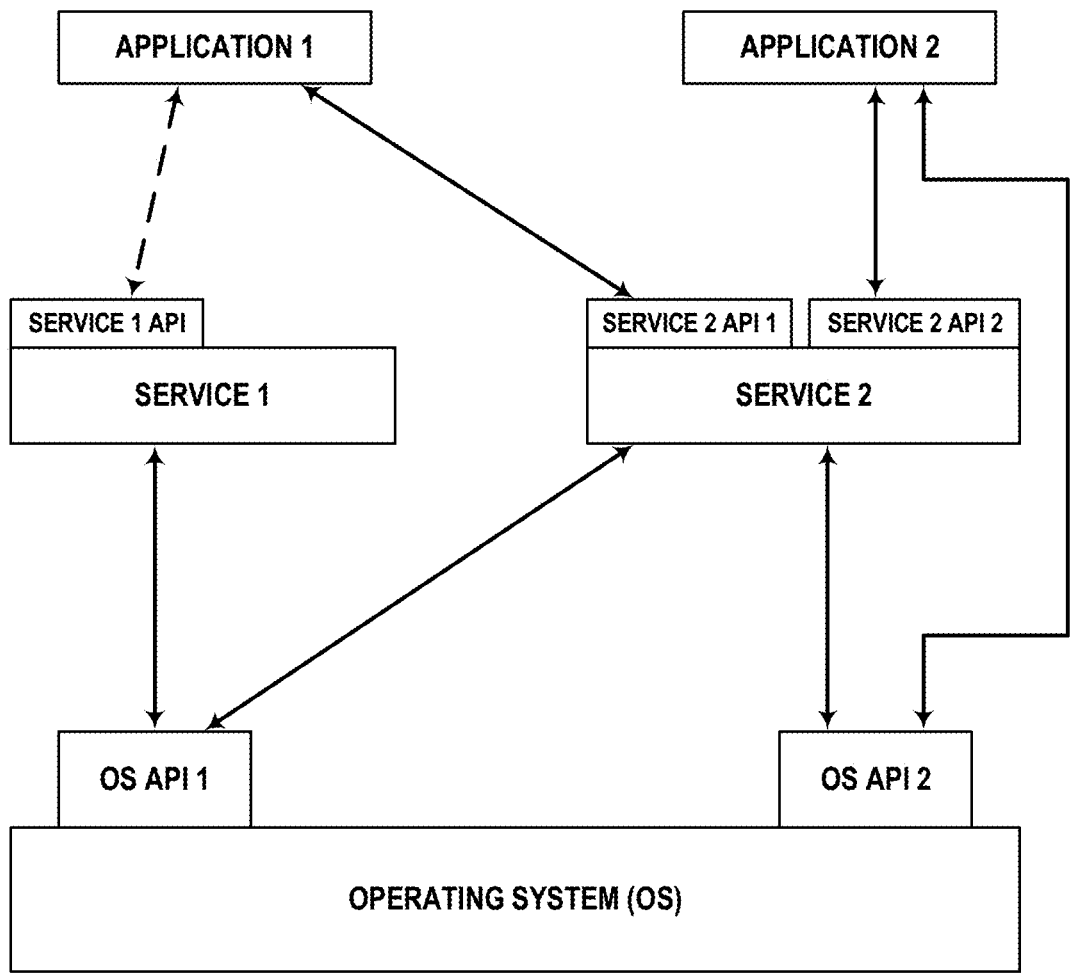
FIG. 12 illustrates an exemplary embodiment of a software stack usable in some embodiments of the invention.

In FIG. 12 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 13:
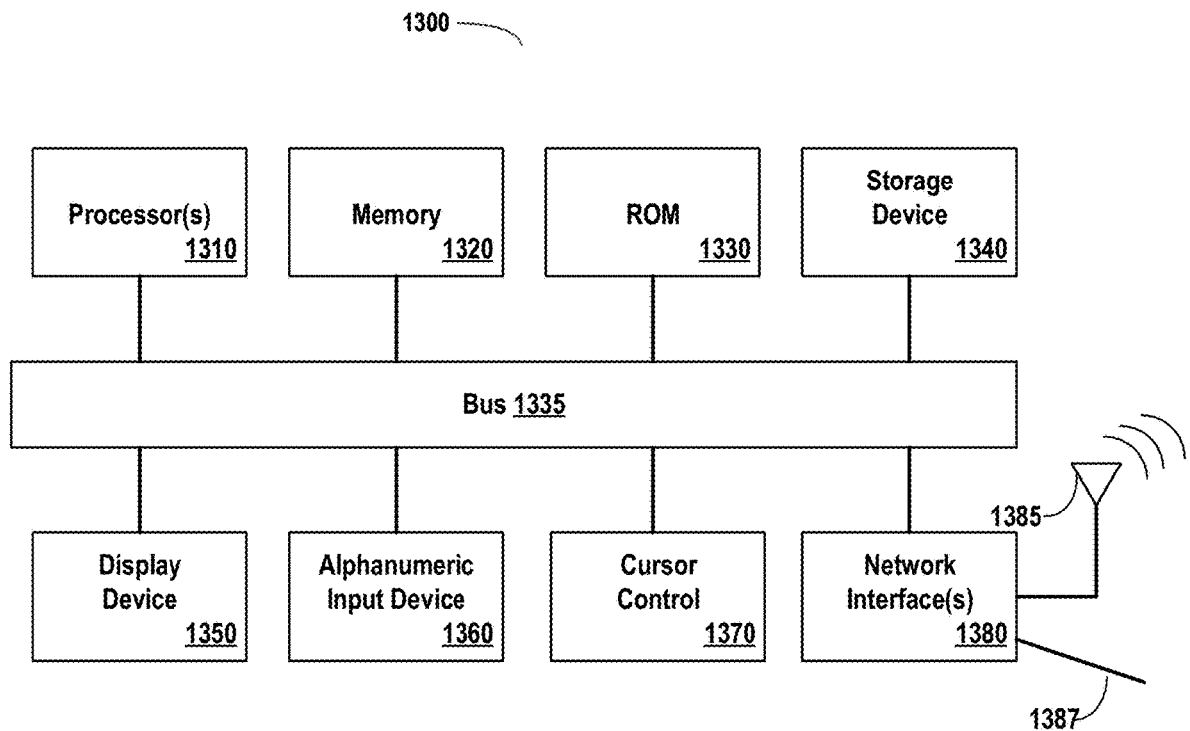
FIG. 13 is a block diagram of one embodiment of a computing system.

FIG. 13 is a block diagram of one embodiment of a computing system 1300. The computing system illustrated in FIG. 13 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 13 may be used to provide the computing device and/or the server device.

Computing system 1300 includes bus 1335 or other communication device to communicate information, and processor(s) 1310 coupled to bus 1335 that may process information.

While computing system 1300 is illustrated with a single set of processor(s) 1310, computing system 1300 can include multiple processors and/or co-processors of various types, having support for various instruction set architectures. Computing system 1300 further may include memory 1320, which can be random access memory (RAM) or other dynamic data storage that can be used as referred to as main system memory. The memory 1320 can be coupled to bus 1335 and can store information and instructions that may be executed by processor(s) 1310. Memory 1320 can also be used to store temporary variables or other intermediate information during execution of instructions by processor(s) 1310.

Computing system 1300 may also include read only memory (ROM) and/or other storage device 1340 coupled to bus 1335 that may store static information and instructions for processor(s) 1310. Data storage device 1340 can be coupled to bus 1335 to store information and instructions. Data storage device 1340 such as flash memory or a magnetic disk or optical disc and corresponding drive may be coupled to computing system 1300.

Computing system 1300 may also be coupled via bus 1335 to display device 1350, such as a cathode ray tube (CRT) or liquid crystal display (LCD), to display information to a user. Computing system 1300 can also include an alphanumeric input device 1360, including alphanumeric and other keys, which may be coupled to bus 1335 to communicate information and command selections to processor(s) 1310. Another type of user input device is cursor control 1370, such as a touchpad, a mouse, a trackball, or cursor direction keys to communicate direction information and command selections to processor(s) 1310 and to control cursor movement on the display device 1350. Computing system 1300 may also receive user input from a remote device that is communicatively coupled to computing system 1300 via one or more network interface(s) 1380.

Computing system 1300 further may include one or more network interface(s) 1380 to provide access to a network, such as a local area network. Network interface(s) 1380 may include, for example, a wireless network interface having antenna 1385, which may represent one or more antenna(e). Computing system 1300 can include multiple wireless network interfaces such as a combination of WiFi, Bluetooth® and cellular telephony interfaces. Network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, network interface(s) 1380 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method performed by a client device, the method comprising:
    transforming a message into a set of chunks;
    receiving a homomorphic encryption key and an encrypted frequency vector from a server, wherein the encrypted frequency vector is encrypted using the homomorphic encryption key;
    applying homomorphic encryption using the received homomorphic encryption key to each individual chunk in the set of chunks to generate a set of encrypted message chunks;
    combining the set of encrypted message chunks with the encrypted frequency vector via a homomorphic computation to compute a homomorphically encrypted score;
    transmitting the homomorphically encrypted score to an aggregation server to enable determination of an action for processing the message;
    receiving message information from the aggregation server, the message information related to the action for processing the message based on the determined homomorphically encrypted score; and
    determining the action for processing the message based at least in part on the message information received from the aggregation server.

2. The computer-implemented method according to claim 1, wherein the message is an e-mail.

3. The computer-implemented method according to claim 1, further comprising:
    determining whether a sender of the message is known; and
    wherein determining the action for processing the message is based at least in part on the sender not being known.

4. The computer-implemented method according to claim 3, wherein the sender is known when an address of the sender is found in a contacts database on the client device or the address of the sender is found in a sender or receiver field of a message in a message database on the client device.

5. The computer-implemented method according to claim 1, further comprising decrypting the message prior to applying the homomorphic encryption to each individual chunk the set of chunks of the message.

6. The computer-implemented method according to claim 1, wherein receiving the message information from the aggregation server includes receiving an encrypted message score from the aggregation server and decrypting the encrypted message score to obtain a message score.

7. The computer-implemented method according to claim 1, further comprising executing the determined action for processing the message.

8. The computer-implemented method according to claim 1, wherein the message is received from a message server.

9. A non-transitory computer readable medium programmed with instructions that, when executed by a client device comprising a processing system having at least one hardware processor, performs operations comprising:
    transforming a message into a set of chunks;
    receiving a homomorphic encryption key and an encrypted frequency vector from a server, wherein the encrypted frequency vector is encrypted using the homomorphic encryption key;
    applying homomorphic encryption using the received homomorphic encryption key to each individual chunk in the set of chunks to generate a set of encrypted message chunks;
    combining the set of encrypted message chunks with the encrypted frequency vector via a homomorphic computation to compute a homomorphically encrypted score;
    transmitting the homomorphically encrypted score to an aggregation server to enable determination of an action for processing the message;
    receiving message information from the aggregation server, the message information related to the action for processing the message based on the determined homomorphically encrypted score; and
    determining the action for processing the message based at least in part on the message information received from the aggregation server.

10. The non-transitory computer readable medium according to claim 9, wherein the message is an e-mail.

11. The non-transitory computer readable medium according to claim 9, further comprising:

determining whether a sender of the message is known; and wherein determining the action for processing the message is based at least in part on the sender not being known.

12. The non-transitory computer readable medium according to claim 11, wherein the sender is known when an address of the sender is found in a contacts database on the client device or the address of the sender is found in a sender or receiver field of a message in a message database on the client device.

13. The non-transitory computer readable medium according to claim 9, further comprising decrypting the message prior to applying the homomorphic encryption to each individual chunk the set of chunks of the message.

14. The non-transitory computer readable medium according to claim 9, further comprising executing the determined action for processing the message.

15. A system comprising:
a processing system coupled to a memory programmed with executable instructions that, when executed by the processing system on a client device perform operations, comprising:
transforming a message into a set of chunks;
receiving a homomorphic encryption key and an encrypted frequency vector from a server, wherein the encrypted frequency vector is encrypted using the homomorphic encryption key;
applying homomorphic encryption using the received homomorphic encryption key to each individual chunk in the set of chunks to generate a set of encrypted message chunks;
combining the set of encrypted message chunks with the encrypted frequency vector via a homomorphic computation to compute a homomorphically encrypted score;
transmitting the homomorphically encrypted score to an aggregation server to enable determination of an action for processing the message;
receiving message information from the aggregation server, the message information related to the action for processing the message based on the determined homomorphically encrypted score; and
determining the action for processing the message based at least in part on the message information received from the aggregation server.

16. The system according to claim 15, wherein the message is an e-mail.

17. The system according to claim 15, further comprising:
determining whether a sender of the message is known; and wherein determining the action for processing the message is based at least in part on the sender not being known.

18. The system according to claim 17, wherein the sender is known when an address of the sender is found in a contacts database on the client device or the address of the sender is found in a sender or receiver field of a message in a message database on the client device.

19. The system according to claim 15, further comprising decrypting the message prior to applying the homomorphic encryption to each individual chunk the set of chunks of the message.

20. The system according to claim 15, further comprising executing the determined action for processing the message.

* * * * *